Patented July 30, 1935

2,009,763

UNITED STATES PATENT OFFICE 2,009,763

FINING HEAT ABSORBING REDUCED GLASS

Robert H. Dalton, Corning, N. Y., assignor to Corning Glass Works, Corning, N. Y., a corporation of New York No Drawing. Application July 30, 1932, Serial No. 627,102

9 Claims. (Cl. 106—36.1)

This invention relates to the fining of glass and has for its object the fining of glass melts and particularly the fining of melts which have been reduced by the addition thereto of reducing agents such as carbon, carbonaceous materials, zinc dust, and the like, herein referred to as reduced glasses.

The above and other objects may be attained by practicing my invention which embodies among its features the addition to glass batches of a small amount of a substance containing iodine.

Glasses reduced by the addition of carbon or carbonaceous materials are practically never perfectly fined and there has long been a need for means for fining such glasses. Arsenic which is ordinarily used as a fining agent is obviously without value in reduced glasses because the successful use of arsenic for this purpose required oxidizing conditions such as the presence of a nitrate or the use of the higher oxide of arsenic. Moreover, it is sometimes difficult to obtain uniform reduction in glasses reduced by carbonaceous materials because the carbon, although initially uniformly distributed throughout the batch, does not readily dissolve in the glass when the batch is melted but tends to segregate and rise to the top of the melt where it may be burned off or cause over-reduction while the bottom part of the melt is insufficiently reduced.

I have discovered that substances containing iodine or compounds thereof, such as; iodine, iodides, iodates, iodoform, and the like, are very efficient fining agents when added in small quantities to glass batches and are particularly suitable for batches for reduced glasses. I have further found that substances containing iodine are of themselves mild reducing agents and inasmuch as they, for the most part, seem to dissolve readily in glass they tend, either when used alone or in conjunction with carbon, to promote more uniform reduction throughout the melt than is possible through the use of carbon alone. On account of their mild action they do not tend to produce the so-called "carbon amber" coloration and the use of an excessive amount, therefore, has not ill effect although on account of expense I prefer to use not more than 2% which I have found to be ample for fining purposes.

As an illustration of the fining and reducing action of substances containing iodine, I give the following glass batches which I have melted and the effects shown in the glasses resulting therefrom.

| | A | B | C | D | E | F | G |
|---|---|---|---|---|---|---|---|
| Sand | 73 | 73 | 73 | 73 | 73 | 73 | 73 |
| Sodium carbonate | 25 | 22 | 25 | 24 | 25 | 24 | 25 |
| Hydrated lime | 14 | 14 | 14 | 14 | 14 | 14 | 14 |
| Alumina | 2 | 2 | 2 | 2 | 2 | 2 | 2 |
| Niter | | 4 | | | | | |
| Arsenic trioxide | | .5 | | | | | |
| Iodine | | | 2 | | | | |
| Sodium iodide | | | | 2 | | | |
| Arsenic iodide | | | | | 2 | | |
| Sodium iodate | | | | | | 3 | |
| Iodoform | | | | | | | 2 |
| Degree of fining | Fine bubbles. | No bubbles. | No bubbles. | No bubbles. | No bubbles. | No bubbles. | No bubbles. |
| Color in thickness of 1 inch | Faint blue green. | Colorless. | Pale blue. | Pale blue green. | Almost colorless. | Pale blue green. | Pale blue green. |

The above glasses contained the usual small amount of iron impurity and the faint coloration due to ferrous oxide was taken as an indication of the state of reduction.

Glass A which contained no fining agent and neither oxidizing nor reducing agents was not fined and was partially reduced as indicated by the color due to ferrous oxide.

Glass B containing niter and arsenic oxide in accordance with prior fining practice was fined and was oxidized as indicated by the lack of color.

Glasses C, D, E, F, and G containing, respectively, iodine, sodium iodide, arsenic iodide, sodium iodate, and iodoform, but no other reducing agents were well fined and with the exception of Glass E were more completely reduced than Glass A.

In the case of Glass E, the arsenic of the arsenic iodide apparently neutralized to some extent the reducing action of the iodine although the fining action was unaffected. Obviously arsenic iodide would be particularly suitable for use in glasses which are not to be reduced although it also is very efficient in reduced glasses if an excess of reducing agent is present, as will hereinafter appear.

In the case of Glasses C and G it is noteworthy that although the iodine material added was in both cases very volatile, yet the finished glasses contained an appreciable amount of iodine as was shown conclusively by analysis. Glasses into which other iodine compounds such as sodium iodide have been introduced also show the presence of iodine by analysis.

As a further illustration of my invention and its application to reduced ultra-violet transmitting glasses, the following batches were prepared and melted. These batches were prepared only in part from purified materials so that the amount of iron present, though small, would be sufficient to affect the ultra violet transmission and thus provide an indication of the degree of reduction.

|  | H | I | J | K |
|---|---|---|---|---|
| Sand | 48 | 48 | 48 | 48 |
| Sodium carbonate | 16 | 14 | 16 | 16 |
| Calcium carbonate | 12 | 12 | 12 | 12 |
| Zinc oxide | 2 | 2 | 2 | 2 |
| Alumina | 1.5 | 1.5 | 1.5 | 1.5 |
| Sugar | 1.5 |  |  | 1.5 |
| Sodium iodide |  |  | 1.5 | 1.5 |
| Niter |  | 3 |  |  |
| Arsenic trioxide |  | .5 |  |  |
| Degree of fining | Fine bubbles | No bubbles | No bubbles | No bubbles |
| Appearance | Cloudy | Clear | Clear | Clear |
| Transmission in 2 mm. thickness at 302 μμ. | 45% | 52% | 68% | 78% |

Glass H which contained sugar as reducing agent but no sodium iodide was not fined and developed a discoloration known as "carbon amber" which was due to excessive reduction and which no doubt was the cause of the transmission of this glass being even lower than that of Glass I which represents the same glass oxidized and fined in accordance with prior practice.

Glass J which contained sodium iodide but no sugar was well fined and also was more reduced than Glass I as indicated by the increase in transmission thereover.

Glass K which contained both sugar and sodium iodide was well fined and was completely and uniformly reduced as indicated by the high transmission.

My invention is particularly valuable in fining the so-called heat absorbing glasses which contain ferrous iron and must be melted with strong reduction. Heretofore, it has been practically impossible to fine such glasses and at the same time to maintain the proper heat absorbing efficiency. The following batches with the results of their melting will illustrate the application of my invention to heat absorbing glasses.

|  | L | M | N | O |
|---|---|---|---|---|
| Sand | 335 | 335 | 335 | 335 |
| Sodium carbonate | 85 | 78 | 82 | 85 |
| Borax | 125 | 125 | 125 | 125 |
| Ferric oxide | 10 | 10 | 10 | 10 |
| Carbon | ½ |  | ½ | ½ |
| Sodium iodide |  | 20 | 10 |  |
| Arsenic iodide |  |  |  | 10 |
| Degree of fining | Fine bubbles | No bubbles | No bubbles | No bubbles |
| Heat transmission in 2mm thickness | 6.3% | 9.1% | 4.4% | 4.3% |

Glass L which contained carbon but no sodium iodide is an example of a prior heat absorbing glass. It was reduced as is shown by the low heat transmission but was not fined.

Glass M contained sodium iodide both as fining agent and as reducing agent in lieu of carbon in accordance with my invention. It was perfectly fined and was largely reduced as is shown by the heat transmission.

Glass N contained both carbon and sodium iodide in accordance with my invention. It was perfectly fined and was more completely reduced than glass M as is shown by its lower heat transmission.

Glass O is an example of the use of arsenic iodide in conjunction with a reducing agent in accordance with my invention and demonstrates that arsenic iodide is suitable for my purpose in a reduced glass. It was perfectly fined and was as well reduced as glass N as is shown by the heat transmissions thereof.

Low expansion borosilicate heat absorbing glasses are particularly difficult to fine on account of their high melting points and relatively high viscosities at melting temperatures. By the addition of 1 to 2% of a material containing iodine to such glasses I am able to fine them and still retain their heat absorbing efficiency. For example, a batch comprising 75 parts sand, 8.6 parts sodium carbonate, 15.9 parts boric acid, 6 parts zinc oxide, 2.7 parts calcium carbonate, 1.5 parts hydrated alumina, 5.3 parts ferrous oxalate, 1 part carbon and 2 parts sodium iodide produces a well fined glass having low expansion and high heat absorbing efficiency.

I have also found that chlorine containing materials are not as efficient fining agents as materials containing iodine and, when introduced into glasses in amount comparable to the amount of iodine material which I have found necessary to cause fining, the chlorine material tends to produce opal glasses particularly in the case of low expansion borosilicates. I, therefore, make no claim to the use of chlorine materials for this purpose.

What I claim is:

1. The method of fining glass melts which includes adding to the batches therefor a small amount of an iodine containing material and a reducing agent.

2. The method of fining glass melts which includes adding to the batches therefor a small amount of an alkali iodide and a reducing agent.

3. The method of fining heat absorbing glasses which includes adding to the batches therefor a small amount of an iodine containing material and a reducing agent.

4. The method of fining heat absorbing glasses which includes adding to the batches therefor a small amount of an alkali iodide and a reducing agent.

5. The method of fining heat absorbing glasses which includes adding to the batches therefor from one to two per cent of sodium iodide and a reducing agent.

6. A glass batch which contains a reducing agent and a small amount of an iodine containing material.

7. A heat absorbing glass batch which contains a small amount of an iodine containing material.

8. A reduced glass which is substantially free from bubbles and which shows by analysis the presence of iodine.

9. A heat absorbing glass which is substantially free from bubbles and which shows by analysis the presence of iodine.

ROBERT H. DALTON.